J. C. BAUM.

SMOKE-CONSUMING FURNACE.

No. 7,683.

Reissued May 15, 1877.

Attest.

C. Walton Jr.

Charles Schammel.

Inventor, John C. Baum, per Wm. Hibbell Fisher,

Attorney.

UNITED STATES PATENT OFFICE.

JOHN C. BAUM, OF CINCINNATI, OHIO.

IMPROVEMENT IN SMOKE-CONSUMING FURNACES.

Specification forming part of Letters Patent No. 128,525, dated July 2, 1872; reissue No. 7,683, dated May 15, 1877; application filed June 23, 1876.

*To all whom it may concern:*

Be it known that I, JOHN C. BAUM, of Cincinnati, State of Ohio, have invented certain new and useful Improvements in Smoke-Consumers, of which the following is a specification:

In the ordinary construction of steam-boilers the furnace proper is located directly under the forward end of the generator, and, as a necessary result of this faulty construction, the gaseous emanations from the burning fuel are brought into immediate and intimate contact with the comparatively cool boiler, thereby instantly reducing the temperature of said emanations to about 550°, which decrease in the temperature of the gases renders them non-combustible, no matter how much atmospheric air may be subsequently admitted to them.

Therefore, to overcome this serious difficulty, I make a radical change both in the construction of the furnace, and also in the manner of using the same, which novel construction enables me to admit air to the gases at the very moment when the latter are heated to the highest degree, as hereinafter more fully explained.

Figure 1:
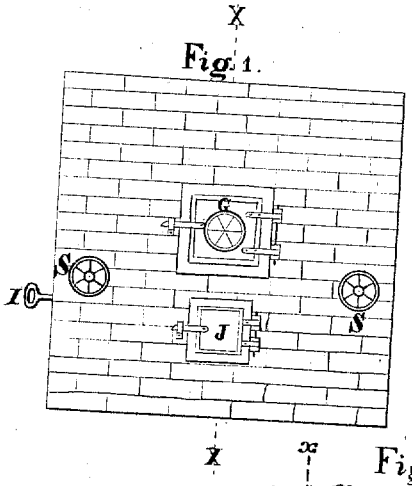
Figure 4:
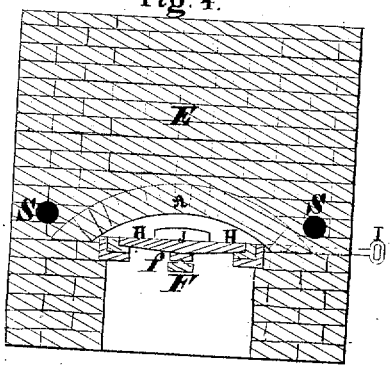
Figure 2:
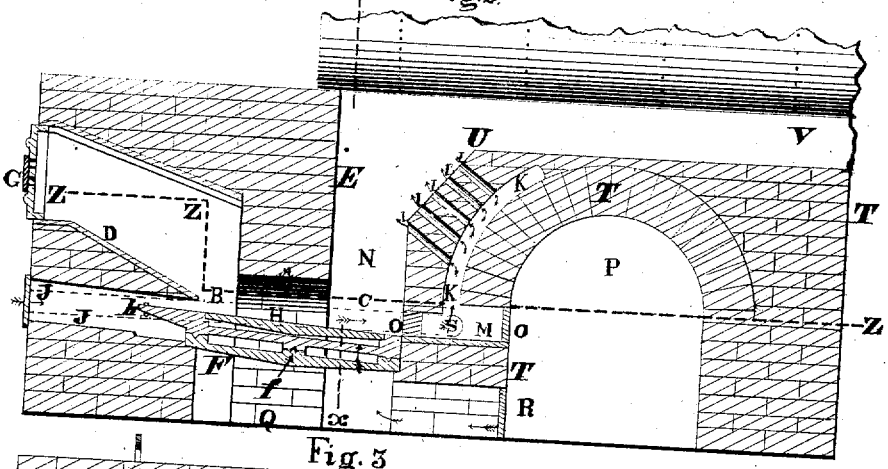
Figure 3:
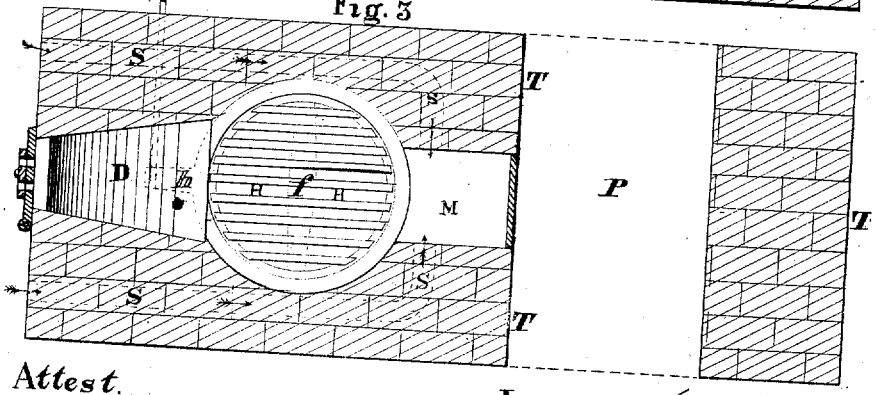

Figure 1 is an elevation of the forward end of a steam-boiler provided with my improved smoke-consumer. Fig. 2 is a longitudinal section of the same at the line X X. Fig. 3 is a horizontal section at the line Z Z. Fig. 4 is a transverse section at the line *x x*.

The leading feature of my improved furnace consists of an arch or other suitable passage, A, in the bridge-wall E, which latter acts as a partition to separate the coking-chamber D from the combustion-chamber C and its upward continuation or neck N. This arch A is situated at the lower end of said bridge-wall E, and is of any suitable height, its width or space being somewhat greater than the diameter of the circular grate H, which is pivoted at *f* to a bridge-bar, F.

The pivot *f* occupies an approximately central position with reference to the arch A of wall E, and the support F of said pivot is so arranged within the furnace as to incline or pitch the grate H from front to rear, as more clearly shown in Fig. 2.

The pitch of this grate may be at any suitable angle that is sufficient to induce the incandescent fuel to slide toward the combustion-chamber C, when said grate is shaken by hand. This shaking or reciprocating rotary motion is imparted to the grate by means of a rod, I, whose outer end is furnished with any convenient handle, while the inner end of said rod is attached to an arm or lug, *h*, of the grate, which arm is free to vibrate within the stoke-hole J of the furnace.

This stoke-hole J is the only part of the furnace through which the fireman can introduce a poker for the purpose of pushing the coal back upon the grate H.

The coking-chamber D, previously alluded to, is provided with a floor that inclines rearwardly, as seen in Fig. 2, so as to shed the fuel, as rapidly as it is consumed, down upon the inclined grate H.

The principal portion of this coking-chamber is situated above the level of arch A, so as to cause the latter to be at all times full of incandescent fuel. G is a registered door of coke-chamber D. The rear of combustion-chamber C and throat N is formed of a wall of masonry, T, having a sloping face, U, for the purpose of gradually increasing the area of said throat. This gradually-expanding throat communicates at top with the longitudinal flue V under the boiler or other apparatus to be heated. This wall is chambered out at K, said chamber or channel being of any suitable size and shape, and closed at top, but open at bottom, where it communicates with a hot-air chamber, M, having inlets S S, that admit air to the chamber M.

P is a large arched way in the masonry T, by which access is had to the fire through door O, hot-air chamber M, and fire-door O′, for the removal of any clinkers that may accumulate upon the grate H. Q is an ash-pit, provided with a registered door, R, which latter enables the draft of the fire being regulated with the utmost nicety. L are tuyeres or nozzles that discharge the highly-heated air from chamber K directly into throat N.

The operation of my smoke-consuming furnace is as follows: The furnace proper B is first filled with coal to a suitable height, and as the fuel is consumed it is distributed over the surface of grate H, so as to completely fill up the arch or channel A, that affords the only communication between the fire-box B and combustion-chamber C.

As the floor D of fire-box B slopes rearwardly, and as the grate H has a corresponding inclination, it is evident that the fuel will naturally descend toward the lower edge of said grate as rapidly as the fuel is consumed.

The gases that emanate from the coal in fire-box B being unable to escape only as they pass through the arch A, and as this arch is completely filled with a mass of incandescent fuel, it is obvious that these gases are thereby raised to the very highest temperature, and, consequently, they are brought into a condition that will insure their ready combustion when subsequently mixed with air.

These gases are confined momentarily within the comparatively-contracted throat N, so as to cause them to combine with the air that passes unconsumed up through the fire from beneath the combustion-chamber C.

As soon as these red-hot gases begin to pass upward along the inclined face U of the wall T they come in contact with numerous streams or jets of highly-heated air, which jets issue from the tuyeres L. By this means the gases are thoroughly consumed before they escape from throat N into the flue V. The enlargement of the neck toward its delivery end serves to diminish the velocity of the gases, and thereby insures a more thorough and intimate mixture of heated air with them. This copious supply of highly-heated air is obtained without in the least diminishing the efficiency or economy of the apparatus as the heat is abstracted from the walls of the furnace, as clearly shown in Figs. 2 and 3.

By referring to these illustrations it will be noticed that the inlets S S of chamber M are formed in the side walls of the apparatus, and, consequently, said channels only take up such heat as would otherwise be lost by radiation through the masonry. The air, being thus warmed by passing through said inlets, is further heated by traversing the chamber M, and by the time it enters the channel K and escapes at tuyeres L the air is heated to such a degree as to combine freely with, and assist in the combustion of, the gases as the latter are discharged through expanding throat N into flue V.

By thus abstracting the principal portion of the heat from the walls of the apparatus, said walls are rendered more durable and less liable to crack or bulge.

By means of the handle I the grate H may be vibrated in a horizontal plane, so as to shake off from it any ashes, small cinders, &c., that may have accumulated thereon.

I claim as my invention—

1. The combination, substantially as specified, of the coking-chamber, the combustion-chamber, the grate-surface, the partition dividing the said chambers and descending to near the grate-surface, and the passages for supplying air to the gases ascending from the incandescent fuel.

2. In combination with fire-box B, combustion-chamber C, and arch A, the pivoted and rearwardly-inclined grate H, whose pivot *f* is located about under the center of said arch, as described.

3. The combination of arch A, inclined feed-channel D, and grate H, substantially as and for the purpose specified.

4. The recess J, in combination with channel D, grate H, and chambers B and C, substantially as and for the purpose specified.

5. The combination of hot-air chamber M, channel K, and orifices L L L, &c., substantially as and for the purpose specified.

6. The combination of chambers B and C with hot-air chamber M, flues S S, channel K, and orifices L L L, &c., substantially as and for the purposes set forth.

J. C. BAUM.

Witnesses:
E. GILLIGAN,
C. WALTON, Jr.